(12) United States Patent
Zhang et al.

(10) Patent No.: US 11,244,178 B2
(45) Date of Patent: Feb. 8, 2022

(54) METHOD AND SYSTEM TO CLASSIFY SIGNS

(71) Applicant: HERE Global B.V., Eindhoven (NL)

(72) Inventors: Zhenhua Zhang, Chicago, IL (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 138 days.

(21) Appl. No.: 16/805,140

(22) Filed: Feb. 28, 2020

(65) Prior Publication Data

US 2021/0271904 A1  Sep. 2, 2021

(51) Int. Cl.
| | |
|---|---|
| G06K 9/00 | (2006.01) |
| G01C 21/32 | (2006.01) |
| G06F 16/35 | (2019.01) |
| G08G 1/01 | (2006.01) |
| G06K 9/62 | (2006.01) |
| G08G 1/0962 | (2006.01) |

(52) U.S. Cl.
CPC ......... *G06K 9/00818* (2013.01); *G01C 21/32* (2013.01); *G06F 16/35* (2019.01); *G06K 9/6226* (2013.01); *G08G 1/0141* (2013.01); *G08G 1/09623* (2013.01)

(58) Field of Classification Search
CPC .. G06K 9/00818; G06K 9/6226; G01C 21/32; G01C 21/34; G01C 21/3822; G06F 16/35; G06F 16/29; G06F 16/2379; G08G 1/0141; G08G 1/09623
USPC ......................................................... 382/104
See application file for complete search history.

(56) References Cited

U.S. PATENT DOCUMENTS

| | | | | |
|---|---|---|---|---|
| 9,423,261 | B2* | 8/2016 | Dorum | G01C 21/34 |
| 10,162,355 | B2* | 12/2018 | Hayon | B60W 30/14 |
| 10,336,190 | B2* | 7/2019 | Yokochi | G06K 9/00798 |
| 11,086,334 | B2* | 8/2021 | Fridman | H04N 7/18 |
| 2016/0104049 | A1 | 4/2016 | Stenneth et al. | |
| 2018/0275276 | A1* | 9/2018 | Ngal | G02B 27/0994 |
| 2019/0285421 | A1* | 9/2019 | Johnston | G01C 21/26 |
| 2019/0325235 | A1* | 10/2019 | Stenneth | G06K 9/6201 |
| 2019/0325236 | A1* | 10/2019 | Zaba | G06K 9/627 |

(Continued)

FOREIGN PATENT DOCUMENTS

JP  2012185076 A  9/2012

OTHER PUBLICATIONS

Transurban, "NSW Partially Automated Vehicle Trials" retrieved on Feb. 28, 2020 from https://cavs.transurban.com/content/dam/cavs/documents/nsw-trials-report.pdf, Dec. 2018, 26 pages.

*Primary Examiner* — Mahendra R Patel

(74) *Attorney, Agent, or Firm* — Ditthavong, Steiner & Mlotkowski

(57) ABSTRACT

A system, a method, and a computer program product for generating classification data of a sign. The method comprises obtaining map data of the sign, obtaining a map matched link and at least one parallel link associated with the sign based on the map data, determining presence data of at least one blocking link between the map-matched link and the at least one parallel link, wherein the at least one blocking link satisfies one or more of a heading criterion and a distance criterion. The method further comprises generating the classification data of the sign based on the presence data of the at least one blocking link.

18 Claims, 9 Drawing Sheets

(56) References Cited

U.S. PATENT DOCUMENTS

| | | | |
|---|---|---|---|
| 2020/0050973 A1* | 2/2020 | Stenneth | G01C 21/32 |
| 2020/0158516 A1* | 5/2020 | Gale | G01C 21/32 |
| 2021/0080268 A1* | 3/2021 | Zhang | G06F 16/2379 |

* cited by examiner

METHOD AND SYSTEM TO CLASSIFY SIGNS

TECHNOLOGICAL FIELD

An example embodiment of the present invention generally relates to mapping and navigation applications, and more particularly relates to classifying signs for mapping and navigation applications.

BACKGROUND

Various navigation applications are available to provide assistance to a user, for example for providing directions for driving, sailing, piloting or other modes of travel. Some of these navigation applications may be web-based or mobile app-based systems, which may be configured to offer navigation applications that allow a user to request directions from one point to another. Further, navigation devices based on Global Positioning System (GPS) technology have also become common for offering navigation applications, and these devices are often used to provide directions to drivers, pedestrians, cyclists, sailors, pilots and the like. For example, in autonomous or semi-autonomous navigation applications, the navigation devices may offer maneuvering directions and further even control maneuvers based on the directions and assistance functions provided by these navigation devices. Oftentimes, the navigation devices may be in communication with a mapping application, such as provided by a third party map service provider and may request map data from the mapping application to receive navigation assistance. In response to this request, the map data may be generated for a region associated with a position of the user associated with the navigation device, such as a user of a vehicle in which a navigation device may be installed.

In certain scenarios the map data is built from learning signs captured by vehicles travelling from one location to another. Various onboard sensors may be employed in the vehicles to capture the signs associated with a region. The map data may be used to provide navigation assistance to a user based on the signs captured by the onboard sensors. Oftentimes, due to a wide field-of-view of most of the onboard sensors, it is highly likely that signs associated with other pathways of the region may also get captured by the onboard sensors. Especially, in context of parallel pathways, onboard sensors of the vehicle travelling on a current pathway may capture and recognize signs associated with the parallel pathways. As such, the vehicle may incorrectly associate the sign on the parallel pathway with the current pathway. Such erroneous data when learnt by a map database may lead to development of an inaccurate map which may not be suitable for providing reliable navigation assistance. Further, errors in map data on parallel pathways, such as parallel roads may at times cause the vehicle to brake or accelerate drastically, which may even lead to accidents.

BRIEF SUMMARY

Accordingly, there is a need for generating accurate map data for parallel routes, such as parallel roads, thereby leading to development of a highly accurate and reliable mapping platform that can be used for providing high quality navigation assistance.

A method, a system, and a computer program product are provided in accordance with an example embodiment described herein for generating classification data of a sign.

According to one example embodiment, a system for generating classification data of a sign may be provided. The system may comprise a memory configured to store computer program code and at least one processor configured to execute the computer program code to obtain map data of the sign, obtain a map matched link and at least one parallel link associated with the sign based on the map data, determine presence data of at least one blocking link between the map-matched link and the at least one parallel link, wherein the at least one blocking link satisfies one or more of a heading criterion and a distance criterion and generate the classification data of the sign based on the presence data of the at least one blocking link.

According to one embodiment, the presence data indicates that the at least one blocking link is present between the map-matched link and the at least one parallel link, and wherein to generate the classification data of the sign, the sign is associated with the map-matched link based on the presence data.

According to one embodiment, the presence data indicates that the at least one blocking link is absent between the map-matched link and the at least one parallel link, and wherein to generate the classification data of the sign, the sign is dropped from being associated with the map-matched link.

According to one embodiment, to determine the presence data of the at least one blocking link, the at least one processor is further configured to: determine a location of the sign based on map data, determine a map matched location of the sign on at least one link of a plurality of links based on the location of the sign and determine a matched heading for the at least one link based on the map matched location of the sign.

According to one embodiment, to determine the presence data of the at least one blocking link, the at least one processor is further configured to obtain a heading of the sign and determine a direction of the at least one link based on the heading of the sign and the matched heading for the at least one link.

According to one embodiment, to determine the direction of the at least one link, the at least one processor is further configured to: determine a difference between the heading of the sign and the matched heading for the at least one link and determine the direction of the at least one link based on the difference satisfying the heading criterion, wherein the heading criterion comprises that the difference is greater than or equal to a first predetermined heading threshold and the difference is lesser than or equal to a second predetermined heading threshold, and wherein the direction of the at least one link is opposite to the sign based on the difference satisfying the heading criterion.

According to one embodiment, to determine the at least one blocking link, the at least one processor is further configured to: obtain a first distance between the location of the road sign and the at least one link based on the map data, obtain a second distance between the location of the sign and the at least one parallel link based on the map data and determine the at least one link as the at least one blocking link based on the at least one link satisfying the distance criterion, wherein the distance criterion comprises that the first distance is smaller than the second distance.

According to one embodiment, to obtain the map matched link the at least one processor is further configured to: extract a probability of proximity to the sign of each of a second plurality of links from the map data and determine a link with highest probability of proximity to the sign among probability of proximity of each of the second plurality of links, as the map matched link.

According to one embodiment, to obtain the at least one parallel link corresponding to the map matched link, the at least one processor is further configured to: determine at least one link from the second plurality of links as the at least one parallel link based on the filtering criterion, wherein the filtering criterion comprises at least one of a first criterion, a second criterion, a third criterion and a fourth criterion, wherein the first criterion comprises that the at least one link from the second plurality of links is independent from the map matched link, wherein the second criterion comprises that a difference between a heading of the at least one link and a heading of the map matched link is less than a predefined heading threshold, wherein the third criterion comprises that a distance between a location of the sign and the at least one link is less than a predefined distance threshold, and wherein the fourth criterion comprises that the distance of the at least one link from the location of the sign is minimum in a set of a plurality of distances associated with the second plurality of links, wherein each distance in the set of the plurality of distances is less than the predefined distance threshold.

According to one embodiment, to generate the classification data of the sign, the at least one processor is further configured to: associate the sign with the map matched link based on determining the at least one parallel link as a pedestrian link based on the map data.

According to one embodiment, to generate the classification data of the sign, the at least one processor is further configured to: associate the sign with the map matched link based on determining that the sign lies on opposite side of the map matched link with respect to the at least one parallel link.

Embodiments of the disclosure also provide a method for generating classification data of a sign, the method comprising: obtaining map data of the sign, obtaining a map matched link and at least one parallel link associated with the sign based on the map data, determining presence data of at least one blocking link between the map-matched link and the at least one parallel link, wherein the at least one blocking link satisfies one or more of a heading criterion and a distance criterion and generating the classification data of the sign based on the presence data of the at least one blocking link.

Embodiments of the disclosure further provide a computer program product, the computer program product may comprise at least one non-transitory computer-readable storage medium having stored computer-executable program code instructions which when executed by a computer, may cause the computer to carry out operations for generating the classification data of a sign, the operations comprising: obtaining map data of the sign, obtaining a map matched link and at least one parallel link associated with the sign based on the map data, determining presence data of at least one blocking link between the map-matched link and the at least one parallel link, wherein the at least one blocking link satisfies one or more of a heading criterion and a distance criterion and generating the classification data of the sign based on the presence data of the at least one blocking link.

The embodiments of the invention may be implemented for vehicles (such as cycles, bikes, cars etc.) travelling along roads with road signs, trains (such as monorails, maglevs, cog trains etc.) travelling along railway tracks with railway signs, marine vehicles (such as boat, ship, submarines etc.) travelling along marine routes with maritime signs, aerial vehicles (such as hot-air balloons, aircrafts, paramotors, drones etc.) travelling along air routes with aerial signs and the like. The term, "link" as used throughout, may refer to any connecting pathway connecting between source location and destination location. The link may be including but not limited to a road-line for vehicles, a rail-line for trains, a marine-line for marine vehicles, air-lines for aerial vehicles and the like. Further, the term, "sign" as used throughout may refer to road signs, railway signs, maritime signs, aerial signs and the like. The signs may be physical signs, virtual signs or combination thereof for providing navigation assistance to travel from the source location and the destination location.

Hereinafter, the example embodiments described generally relate to vehicles travelling along the roads posted with the road signs. Thus, signs and road signs may be used interchangeably. However, it is to be understood that the example embodiments described herein with respect to vehicles travelling on roads are for the purpose of illustration only and should not be regarded as limiting. It may be contemplated that additional embodiments may be implemented for the trains travelling along railway tracks with railway signs, the marine vehicles travelling along marine routes with maritime signs, the aerial vehicles travelling along air routes with aerial signs and the like within the scope of the invention.

BRIEF DESCRIPTION OF THE DRAWINGS

Figure 1:
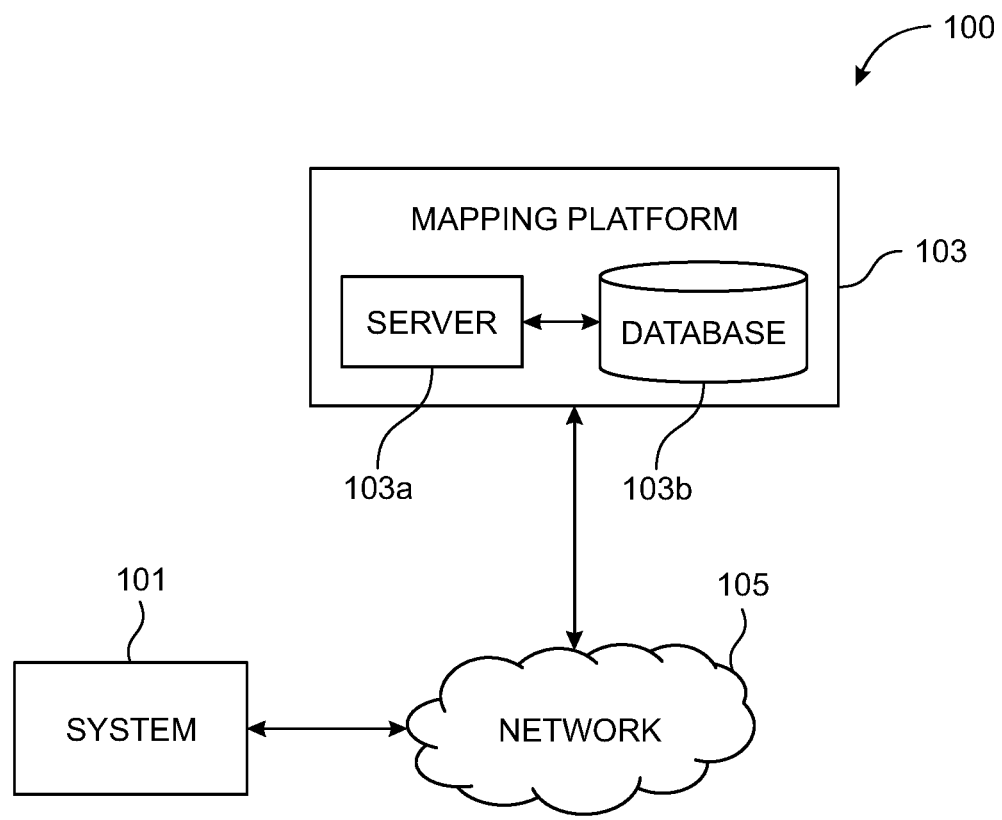
Figure 2:
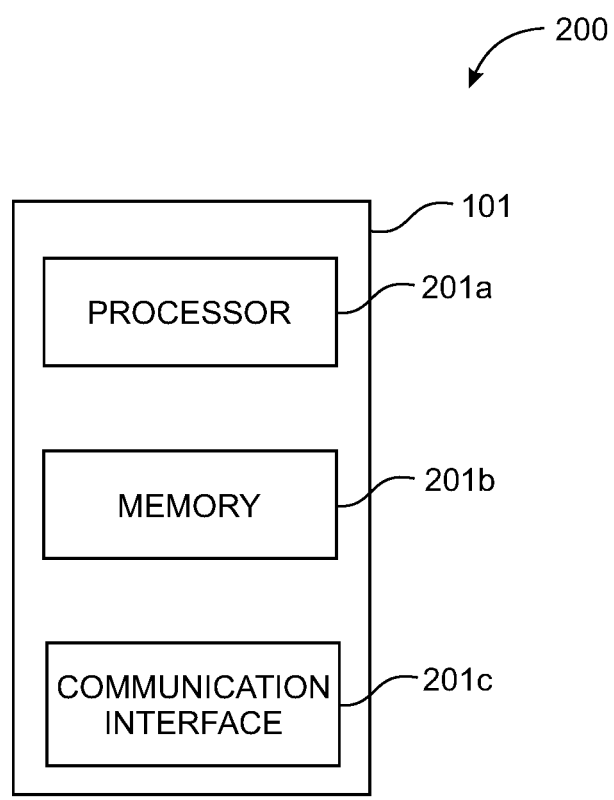
Figure 3:
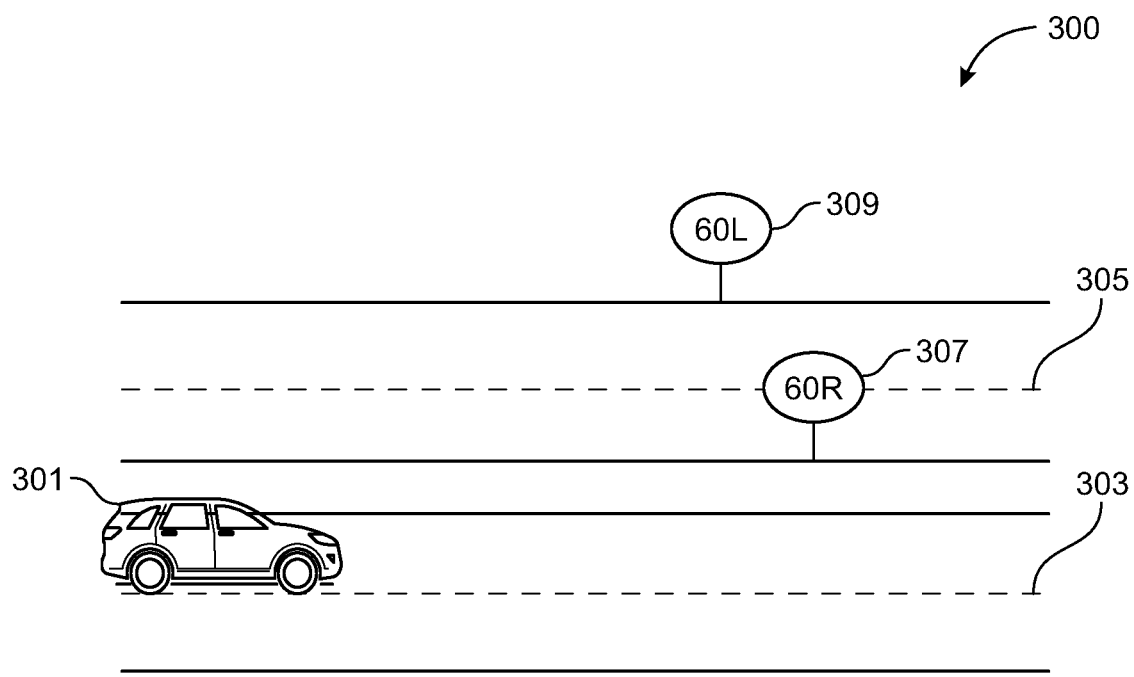
Figure 4:
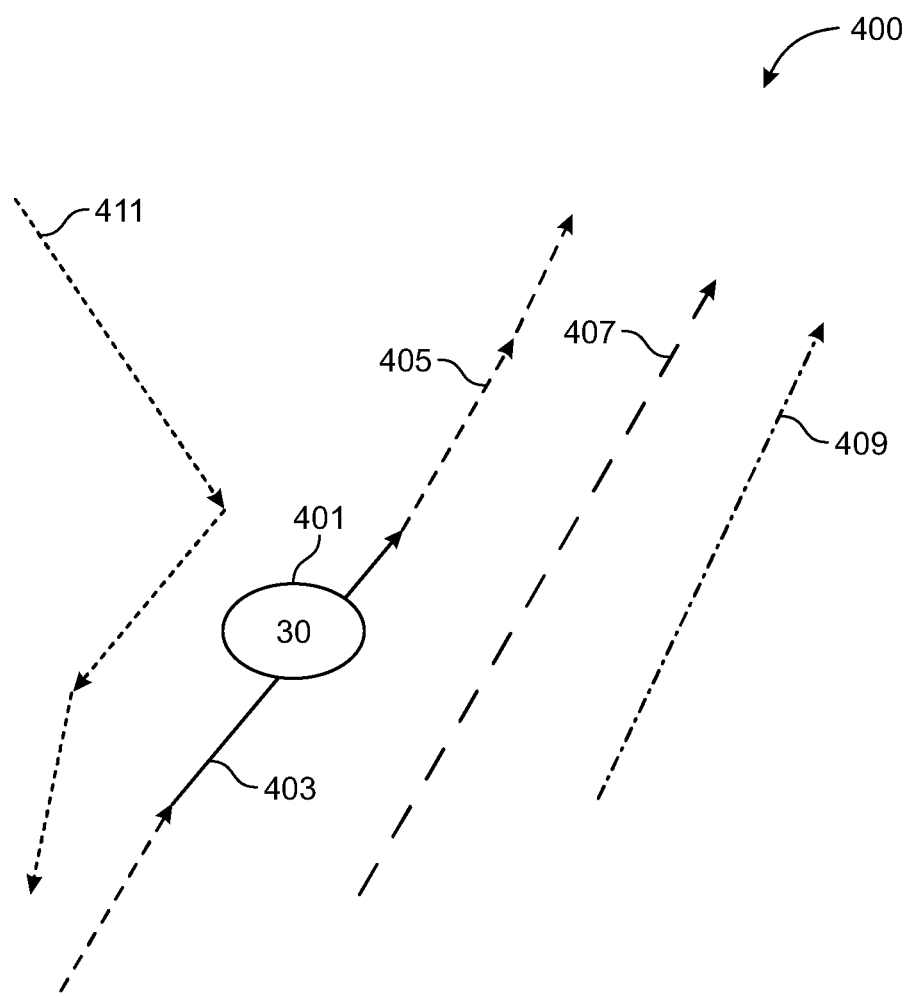
Figure 5:
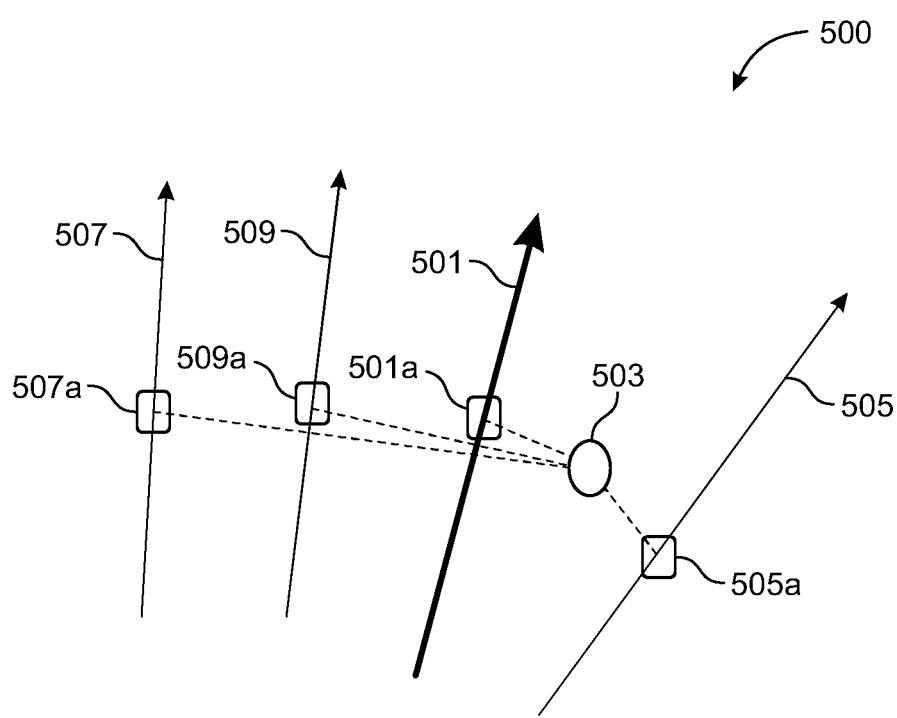
Figure 6B:
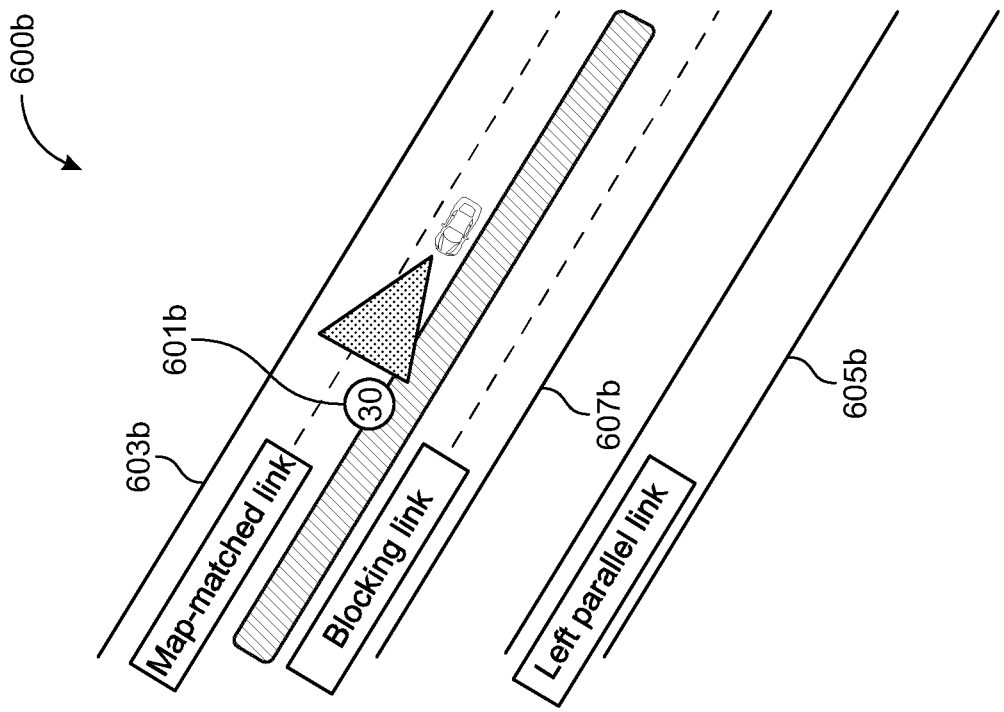
Figure 6A:
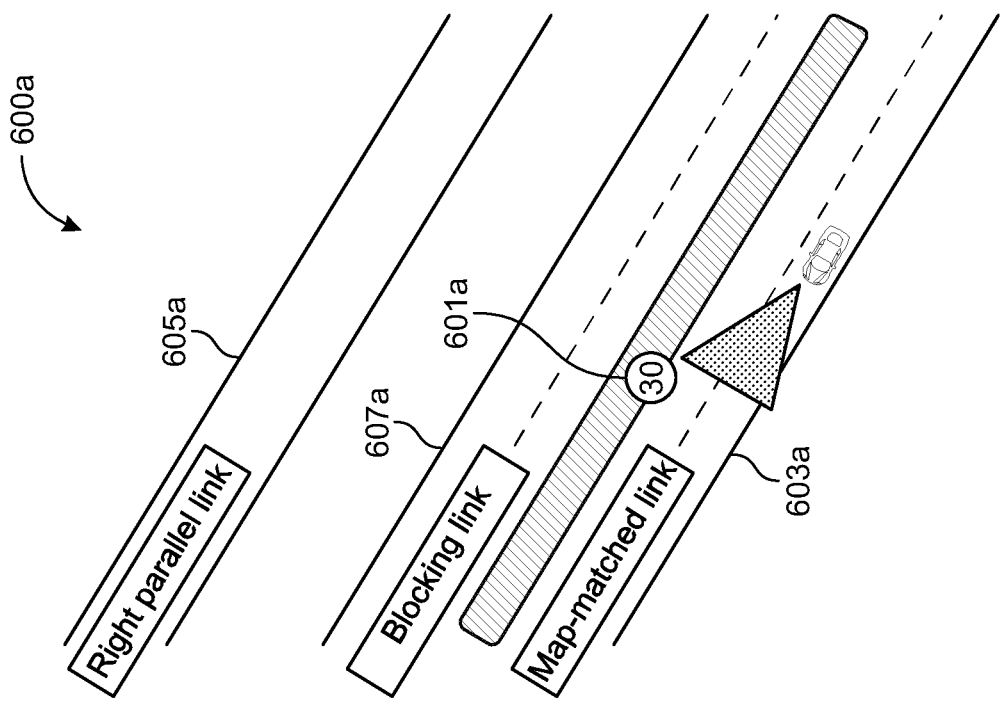
Figure 7:
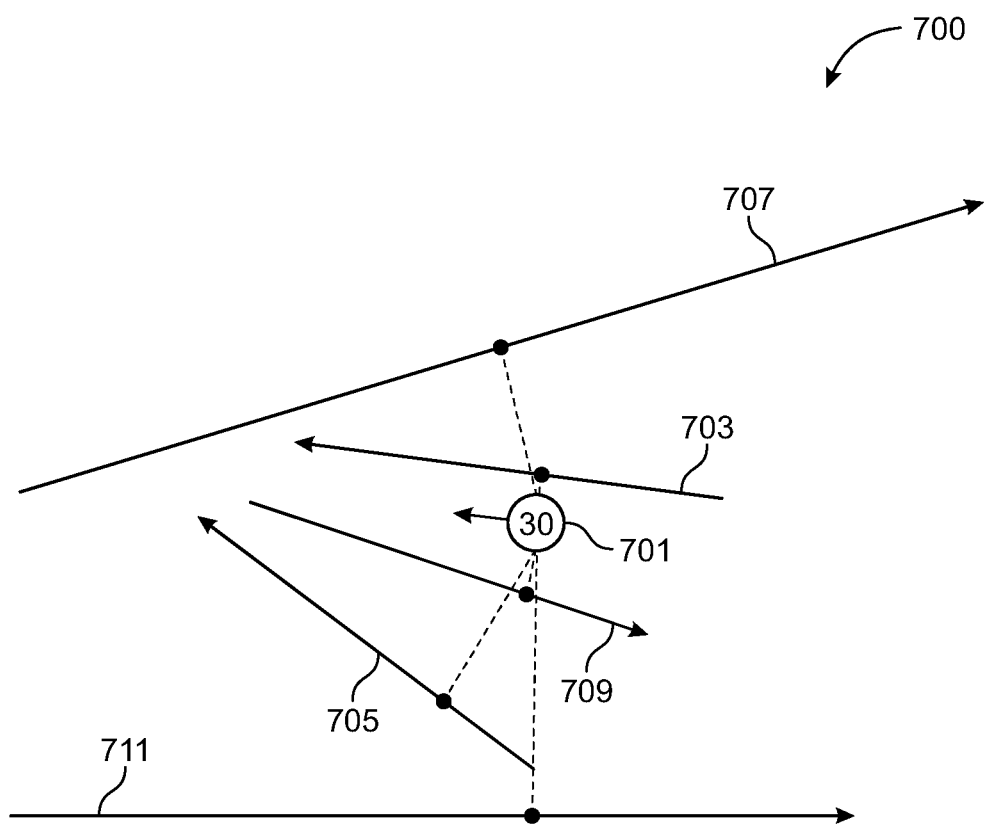
Figure 8A:
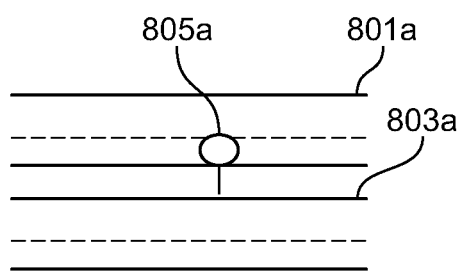
Figure 8B:
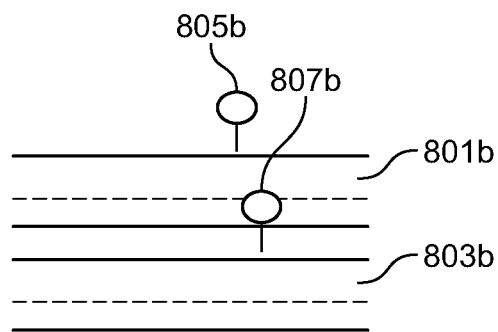
Figure 8C:
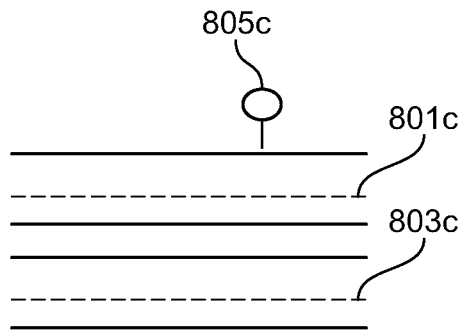
Figure 8D:
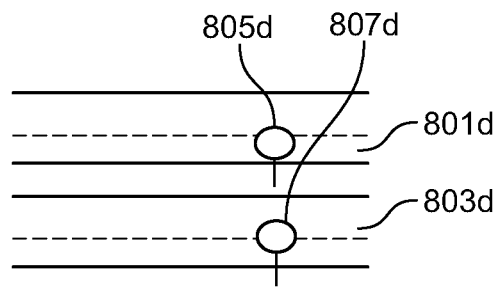
Figure 9:
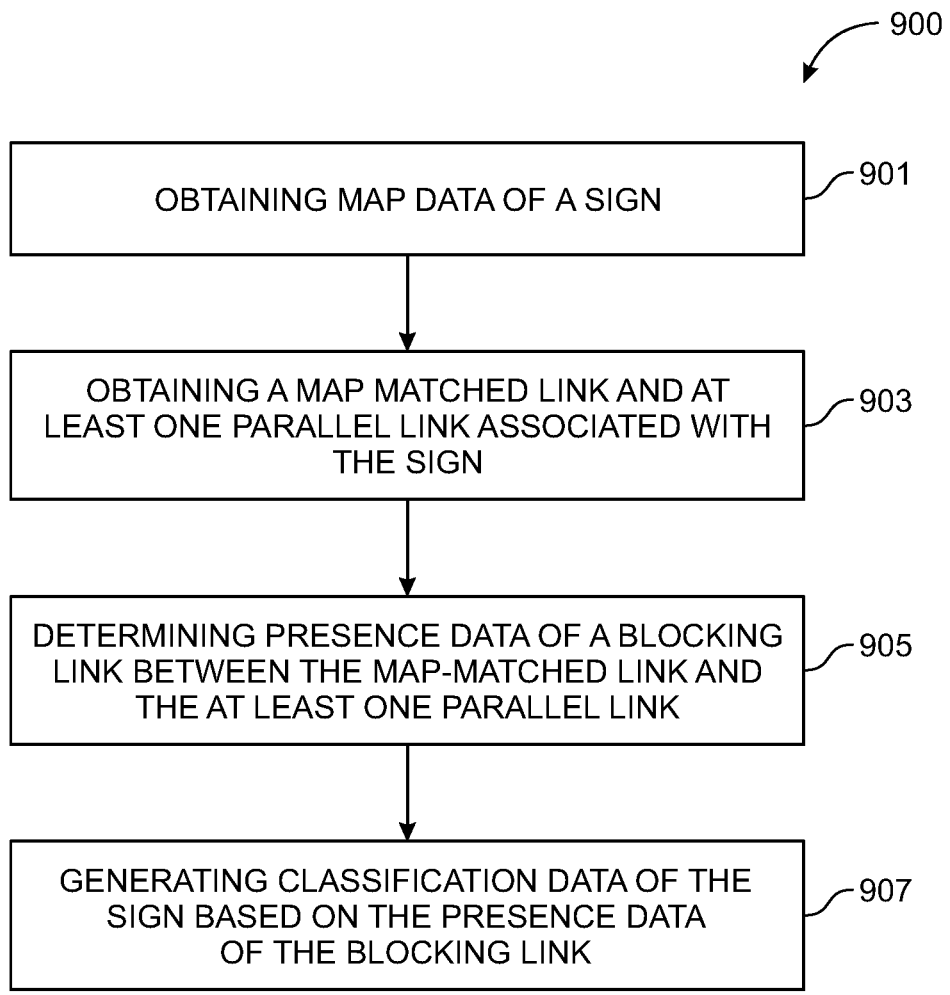

Having thus described example embodiments of the invention in general terms, reference will now be made to the accompanying drawings, which are not necessarily drawn to scale, and wherein:

FIG. 1 illustrates a schematic diagram of a network environment of a system for classifying a sign, in accordance with an example embodiment;

FIG. 2 illustrates a block diagram of the system for generating classification data of a sign, in accordance with an example embodiment;

FIG. 3 illustrates an exemplary scenario depicting a system for generating classification data of a sign, in accordance with an example embodiment;

FIG. 4 illustrates an exemplary scenario for determining a map matched link associated with a sign in a region, in accordance with an example embodiment;

FIG. 5 illustrates an exemplary scenario for extracting at least one parallel link for a map matched link associated with a sign, in accordance with an example embodiment;

FIGS. 6A-6B illustrate scenarios for identifying a blocking link between the map matched link and the at least one parallel link, in accordance with an example embodiment;

FIG. 7 illustrates an example scenario for determining a blocking link based on the heading criterion and the distance criterion, in accordance with an example embodiment;

FIGS. 8A-8D illustrate scenarios for generating classification data of sign based on a map matched link and at least one parallel link, in accordance with an example embodiment; and FIG. 9 illustrates a flowchart for implementation of an exemplary method for generating classification data of a sign, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may additionally refer to any connecting pathway including but not limited to a roadway, a highway, a freeway, an expressway, a lane, a street path, a road, an alley, a controlled access roadway, a free access roadway and the like.

The term "route" may refer to a path from a source location to a destination location on any link.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

The term "road sign" may refer to a sign positioned at the side of or above roads (such as on a gantry) to provide information to road users. The road signs may include but not limited to a static speed limit sign, a dynamic speed limit sign, a variable speed limit sign and the like.

End of Definitions

Mapping and navigation applications generally use stored map content for providing navigation applications. The map content may be provided by map content providers, which may own one or more dedicated vehicles to provide real-time content for navigation applications. The dedicated vehicles may travel from one region to another region and gather sensor data comprising data about road signs posted on each road of the region. The map content providers utilize the sensor data gathered by sophisticated on-board sensors of the dedicated vehicles to provide real-time map data to users of the navigation application. Typically, the number of dedicated vehicles providing content for the navigation application is insufficient. Thus, the map content providers may utilize OEM vehicles for providing content to the map database of the navigation application.

However, the sensors of the OEM vehicles may detect signs, such as the road signs with low accuracy. For example, the sensors of the OEM vehicles may also detect a road sign on a different road in addition to the road sign on current road. The afore mentioned problem may significantly increase when the OEM vehicle is travelling in a region associated with parallel roads. In such cases, the sensors onboard of the OEM vehicle travelling on the current road may wrongly detect a road sign associated with the parallel road. Further, the sensors may misclassify the road sign associated with the parallel road to be associated with the current road. Thus, utilization of the OEM vehicles for providing content for the map database may result in capturing of erroneous sensor data. The map database when updated by the erroneous sensor data may provide the user with incorrect navigation information. The erroneous sensor data may thus lead to an error in decision making for maneuvering of the user vehicle and may also lead to accidents in certain scenarios. Accordingly, there is a need for providing accurate road sign data in real-time. Further, there exists a need for generating accurate classification data for the road sign, to be able to identify the correct link that the road sign may belong to.

A method, system, and computer program product are provided herein in accordance with an example embodiment for generating classification data of a sign associated with a plurality of links in a region. In some example embodiments, the method, system, and computer program product provided herein may also be used for enhancing the accuracy of sign determination using sensor data. The method, system, and computer program product disclosed herein provide measures for ensuring high accuracy in learning a sign for navigation applications. Therefore, embodiments of the present disclosure provide highly reliable map data that may be used for high-end applications such as including, but not limited to, semi-autonomous, autonomous or self-driving vehicles.

According to an example embodiment, the method, system, and computer program product disclosed herein may provide for sending a notification message for the updated map database based on the generated classification data for the signs and accordingly accurately classify the signs. The notification message may for example, inform a vehicle about availability of accurate and up to date map data for a region. Alternately, the available up to date map data may be pushed as an update to the vehicle. In this way, a beneficiary of the map data (such as the vehicle) can be provided with highly accurate navigation assistance based on the updated map data. These and other technical improvements of the invention will become evident from the description provided herein.

FIG. 1 illustrates a schematic diagram 100 of a network environment of a system 101 for generating classification data of a sign, in accordance with an example embodiment. For the purpose of illustration in FIG. 1, the sign may be a road sign. However, as already discussed, sign could also mean many other sign as already discussed previously. As illustrated in FIG. 1, the schematic diagram 100 may comprise a system 101, a mapping platform 103, and a network 105. In various embodiments, the system 101 may be an (Original Equipment Manufacturer) OEM cloud. According to some embodiments, the system 101 may be a backend server, a remotely located server, or the like. In some embodiments, the system 101 may be onboard a vehicle, such as the system 101 may be a navigation system installed in the vehicle. In various embodiments, the vehicle may be an autonomous vehicle, a semiautonomous vehicle, or a manual vehicle. In an embodiment, the system 101 may be a server 103a of the mapping platform 103 and therefore may be co-located with or within the mapping platform 103. The system 101 may be communicatively coupled with the mapping platform 103 over the network 105.

The network 105 may be wired, wireless, or any combination of wired and wireless communication networks, such as cellular, Wi-Fi, internet, local area networks, or the like. In some embodiments, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The system 101 may communicate with the mapping platform 103, via the network 105, where the mapping platform 103 may comprise a map database 103b for storing map data, and a processing server 103a for carrying out the processing functions associated with the mapping platform 103. The map database 103b may store node data, road segment data or link data, point of interest (POI) data, posted signs related data, such as road sign data or the like. The map database 103b may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as used by vehicles, for example, cars, trucks, buses, motorcycles, and/or other entities.

Optionally, the map database 103b may contain path segment and node data records or other data that may represent pedestrian paths or areas in addition to or instead of the vehicle road record data, for example. The road/link segments and nodes may be associated with attributes, such as geographic coordinates, street names, address ranges, lane level speed profile (historically derived speed limits for a lane), lane level maneuver pattern (lane change patterns at intersections), and other navigation related attributes, as well as POIs, such as fueling stations, hotels, restaurants, museums, stadiums, offices, auto repair shops, buildings, stores, parks, etc. The map database 103b may include data about the POIs and their respective locations in the POI records. The map database 103b may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 103b may include event data (e.g., traffic incidents, construction activities, scheduled events, unscheduled events, etc.) associated with the POI data records or other records of the map database 103b. The map database 103b may additionally include data related to road signs and last mile connectivity information from different locations in a geographical region. The map database 103b may be communicatively coupled to the processing server 103a. Additionally, the map database 103b may comprise data about railway tracks, aerial routes (such as for aerial vehicles and drones), maritime routes and the like.

The processing server 103*a* may comprise processing means and communication means. For example, the processing means may comprise one or more processors configured to process requests received from the system 101. The processing means may fetch map data from the map database 103*b* and transmit the same to the system 101 in a format suitable for use by the system 101. In one or more example embodiments, the mapping platform 103 may periodically communicate with the system 101 via the processing means to update a local cache of the map data stored on the system 101. Accordingly, in some example embodiments, the map data may also be stored on the system 101 and may be updated based on periodic communication with the mapping platform 103. In some example embodiments, as disclosed in conjunction with the various embodiments disclosed herein, the system 101 may be used to determine a sign type of a sign.

FIG. 2 illustrates a block diagram 200 of the system 101 for generating the classification data of a sign and accordingly to classifying the sign, in accordance with an example embodiment. The system 101 may comprise a processing means such as processor 201*a*, storage means such as memory 201*b*, and a communication means such as communication interface 201*c*. The processor 201*a* may retrieve computer program code instructions that may be stored in the memory 201*b* for execution of the computer program code instructions.

The processor 201*a* may be embodied in a number of different ways. For example, the processor 201*a* may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201*a* may include one or more processing cores configured to perform independently. A multi-core processor may enable multiprocessing within a single physical package. Additionally or alternatively, the processor 201*a* may include one or more processors configured in tandem via the bus to enable independent execution of instructions, pipelining and/or multithreading. Additionally or alternatively, the processor 201*a* may include one or more processors capable of processing large volumes of workloads and operations to provide support for big data analysis. In an example embodiment, the processor 201*a* may be in communication with a memory 201*b* via a bus for passing information among components of the system 101.

Additionally or alternatively, the processor 201*a* may include one or more processors capable of processing large volumes of workloads and operations to provide support for big data analysis. In an example embodiment, the processor 201*a* may be in communication with a memory 201*b* via a bus for passing information among components of system 101. The memory 201*b* may be non-transitory and may include, for example, one or more volatile and/or non-volatile memories. In other words, for example, the memory 201*b* may be an electronic storage device (for example, a computer readable storage medium) comprising gates configured to store data (for example, bits) that may be retrievable by a machine (for example, a computing device like the processor 201*a*). The memory 201*b* may be configured to store information, data, content, applications, instructions, or the like, for enabling the system 101 to carry out various functions in accordance with an example embodiment of the present invention. For example, the memory 201*b* could be configured to buffer input data for processing by the processor 201*a*. As exemplarily illustrated in FIG. 2, the memory 201*b* may be configured to store instructions for execution by the processor 201*a*. As such, whether configured by hardware or software methods, or by a combination thereof, the processor 201*a* may represent an entity (for example, physically embodied in circuitry) capable of performing operations according to an embodiment of the present invention while configured accordingly. Thus, for example, when the processor 201*a* is embodied as an ASIC, FPGA or the like, the processor 201*a* may be specifically configured hardware for conducting the operations described herein. Alternatively, as another example, when the processor 201*a* is embodied as an executor of software instructions, the instructions may specifically configure the processor 201*a* to perform the algorithms and/or operations described herein when the instructions are executed. However, in some cases, the processor 201*a* may be a processor specific device (for example, a mobile terminal or a fixed computing device) configured to employ an embodiment of the present invention by further configuration of the processor 201*a* by instructions for performing the algorithms and/or operations described herein. The processor 201*a* may include, among other things, a clock, an arithmetic logic unit (ALU) and logic gates configured to support operation of the processor 201*a*.

In some embodiments, the processor 201*a* may be configured to provide Internet-of-Things (IoT) related capabilities to users of the system 101 disclosed herein, such as, speed limit recommendations to the user or automatic speed adjustments for autonomous vehicles. The IoT related capabilities may in turn be used to provide smart city solutions by providing route selection updates, big data analysis, and sensor-based data collection by using the cloud based mapping system for providing navigation and route recommendation services to the autonomous delivery vehicle. In some embodiments, the system 101 may be configured to provide an environment for development of real time speed update recommendation in accordance with the embodiments disclosed herein. The environment may be accessed using the communication interface 201*c*.

The communication interface 201*c* may comprise input interface and output interface for supporting communications to and from any component with which the system 101 may communicate. The communication interface 201*c* may be any means such as a device or circuitry embodied in either hardware or a combination of hardware and software that is configured to receive and/or transmit data to/from a communications device. In this regard, the communication interface 201*c* may include, for example, an antenna (or multiple antennae) and supporting hardware and/or software for enabling communications with a wireless communication network. Additionally or alternatively, the communication interface 201*c* may include the circuitry for interacting with the antenna(s) to cause transmission of signals via the antenna(s) or to handle receipt of signals received via the antenna(s). In some environments, the communication interface 201*c* may alternatively or additionally support wired communication. As such, for example, the communication interface 201*c* may include a communication modem and/or other hardware and/or software for supporting communication via cable, digital subscriber line (DSL), universal serial bus (USB) or other mechanisms.

In some example embodiments, the communication interface 201*c* may be configured to enable the system 101 to exchange data with the mapping platform 103, such as for classifying a sign as illustrated in FIG. 3.

FIG. 3 illustrates an exemplary scenario depicting a system 300 for generating the classification data of a sign, in accordance with an example embodiment. The system 300 of FIG. 3 exemplarily illustrates a scenario for generating classification data of a road sign. However, the consideration of road sign is for illustrative purpose only, and should in no way be construed to be limiting the scope of the invention. A vehicle 301 (such as a vehicle comprising the system 101 as illustrated in FIG. 1 and FIG. 2) may be traveling on a link 303. Another link 305 may be near the link 303 on which road signs 307 and 309 may be posted. The link 303 and the link 305 may be parallel to each other and therefore may be referred to as parallel roads or parallel links. For the sake of consideration within this disclosure, the parallel links may comprise two or more links that may not be connected to each other and the vehicles travelling on these links may have similar travel direction. However, this definition of parallel links is provided for sake of clarity only, and should not be construed to be limiting the scope of the parallel links in any way, as may be contemplated by a person of ordinary skill in the art.

The road sign 309 may fall within a field of view of the onboard sensors of the vehicle 301 and may thus be captured by the vehicle 301. The vehicle 301 may process the captured road sign 309 and report it as being posted on the link on which the vehicle 301 may be traversing (in this case the link 303). However, since the sign 309 is posted on the link 305, the vehicle 301 may report erroneous map data regarding the sign observations for the road sign 309. Similarly, the vehicle 301 may report erroneous map data regarding the sign observations for the road sign 307 as well. This problem may be referred to as a parallel road problem. When such erroneous sign observation is learnt and is used to build/update a map database (such as the database 103b of the mapping platform 103) the map database cannot be regarded as reliable and users of such a map database may be provided with improper navigation assistance. Alternately, if the erroneous observation is utilized locally by the vehicle 301 for performing navigation functions, the vehicle 301 may not be able to correctly comprehend the sign observations which can lead to undesired situations such as accidents.

In some example embodiments, the system 101 may provide measures for rectifying the aforesaid parallel road problem. For example, when the sign observation is reported at the mapping platform 103 for learning purposes, the mapping platform 103 may trigger and invoke the system 101 to generate accurate map data corresponding to the sign observation if it is found that the sign observation is likely prone to a potential parallel road problem. Alternately, the system 101 may be invoked on demand or routinely to detect and correct the map data learnt for signs that may be prone to the parallel road problem.

Referring to FIG. 3, in an example embodiment, the vehicle 301 may capture and report to the mapping platform 103 sign observations for the road sign 309 as being associated with the link 303. In response the mapping platform 103 may determine whether parallel roads exist for the reported signs/link. In the exemplary scenario depicted in FIG. 3, the link 305 exists as the parallel road for the link 303. Accordingly, the mapping platform 103 may invoke the system 101 to rectify the parallel road problem for the reported signs and to classify the road signs 307 and 309 as belonging to their proper links, such as the link 305 in the example depicted in the system 300 of FIG. 3.

Additionally or alternatively, the mapping platform 103 may invoke the system 101 regularly, at periodic intervals to determine whether parallel roads exist in a region (such as, the region in which the road signs 307 and 309 may be posted) using map data associated with the region. On determining that the parallel roads, such as, the pair of links 303 and 305 exist in the region, the mapping platform 103 may store data associated with the links 303 and 305 in the map database 103b. Further, if any sign observations for a road sign, such as, the road signs 307 and 309 are reported as being posted on the predetermined parallel roads (links 303 and 305), such as in an offline mode. the mapping platform 103 may invoke the system 101 to rectify the parallel road problem and to classify the road signs 307 and 309 as belonging to their proper links.

On being triggered, the system 101 may obtain map data of the reported road sign 309 from the database 103b. The system 101 may further determine a map matched link for the road sign 309 based on the map data, described in detailed with reference to FIG. 4.

FIG. 4 illustrates an exemplarily scenario 400 for determining map matched link associated with a road sign 401 (such as the road sign 309) in a region, in accordance with an example embodiment. The system 101 may obtain map data of the region from the map database 103b. In some example embodiments, the map data may include data about geographical regions such as geographical maps of countries, cities, towns, suburbs and the like. Further, the system 101 may define a region within a threshold radius from a road sign. The region may be a circular region that may encompass a geographical region comprising a plurality of links around the road sign. Alternately, the region may be of any arbitrary shape and size.

In some example embodiments, the map data may comprise link data and/or sign data. The link data may comprise information of each link of a plurality of links in the region associated with the road sign 401. For example, the link data may comprise one or more of a link start node, a link end node, shape location points, road classifier data, access information, functional class, speed category, heading of the link, lane count, map speed limit associated with a particular link and the like. The sign data of the map data may comprise geo-location of the road sign 401, map matched location of the road sign 401, heading information of the road sign 401, sign type, sign permanency, sign value and the like. In some example embodiments, the map data may comprise combination data. The combination data may be obtained based on the link data and the sign data. For example, distance from sign to various links, heading difference and the like.

The system 101 may extract a plurality of links associated with the road sign 401 from the map data. Further, the system 101 may determine a probability for each of the plurality of links associated with the road sign 401 based on the map data. The probability of each link may signify proximity of the link to the road sign 401. For example, a link near the road sign 401 may have higher probability than another link far from the road sign 401. The system 101 may further determine highest probability among the probabilities of each link in the plurality of links. The system 101 may obtain the link associated with the highest probability from the plurality of links. The obtained link with the highest probability may be the map matched link 403 of the road sign 401.

Further, each of the link with relatively less probability than the probability of the map matched link 403 may be at least one of, for example, a link that may connect to the map matched link 403 directly or indirectly, such as, a link 405; a link parallel to the map matched link 401, such as, a link 407; a link next to the parallel link 407, such as, a link 409; a link with opposite direction to the map matched link 403, such as, a link 411, and the like. The system 101 may extract the link parallel to the map matched link 403 as described in detail with reference to FIG. 5.

FIG. 5 illustrates an exemplary scenario 500 for extracting at least one parallel link for a map matched link 501 (such as the map matched link 403) associated with a road sign 503 (such as the road sign 401), in accordance with an example embodiment. The system 101 may extract a map matched location of the road sign 503 on each of the plurality of links from the map data. For example, the numerals 501*a*, 505*a*, 507*a* and 509*a* may correspond to the map matched location of the road sign 503 on the links 501, 505, 507 and 509 respectively. The map matched location of the road sign 503 on a link may be obtained by dropping a perpendicular line from the location of the road sign 503 to each of the links 501, 505, 507, and 509. For example, a perpendicular line drawn from the location of the road sign 503 to the link 501 intersects the link 501 at the point 501*a*. Thus, 501*a* is the map matched location of the road sign 503 on the link 501. Similarly, the other map matched locations 505*a*, 507*a*, and 509*a* may be obtained. Further, the system 101 may also extract a heading for each of the plurality of links from the map data. The heading of a link (such as, the links 501, 505, 507, and 509) may indicate direction of a vehicle travelling on the link. For example, as shown in FIG. 5, for links 501, 505, 507, and 509 with same heading, the direction of one or more vehicles travelling on the corresponding links 501, 505, 507, and 509 may also be same.

The system 101 may further obtain each link of the plurality of links to determine if the link is parallel to the extracted map matched link 501. For example, the system 101 may obtain each link with less probability than the probability of the map matched link 501 to determine if the link is parallel to the map matched link 501. The system 101 may run a search to determine if at least one link of the plurality of links satisfies a filtering criterion comprising one or more of a first criterion, a second criterion, a third criterion and a fourth criterion. The first criterion may comprise that the at least one link of the plurality of links is independent of the map matched link 501, in other words, a link that is part of the map matched link 501 may not be a parallel link. The second criterion may comprise that a difference between the heading of the at least one link and the heading of the map matched link 501 is less than a predefined heading threshold. The predefined heading threshold may be a configurable value, and may be set based on a plurality of environmental and vehicle parameters. The third criterion may comprise that a distance between the geo-graphical location of the road sign and the map matched location of the at least one link is less than a predefined distance threshold. Again, the predefined distance threshold may also be a configurable entity. The fourth criterion may comprise that the distance of the at least one link from the location of the road sign is minimum in a set of a plurality of distances associated with the second plurality of links. Further the set of plurality of distances may specify distance values of various links from the map-matched link. Additionally, each distance in the set of the plurality of distances may be less than the predefined distance threshold.

As mentioned previously, the predefined heading threshold and the predefined distance threshold may be configurable values. For example, in some embodiments, the predefined heading threshold may be 40 degree and the predefined distance threshold may be 30 meter. It may be contemplated that the values of the predefined heading threshold and the predefined distance threshold may be defined considering factors such as link lengths, road type and the like. The system 101 may extract the at least one link that satisfies one or more of the first criterion, the second criterion, the third criterion and the fourth criterion as the at least one parallel link. Further, the system 101 may determine a direction/side of the at least one parallel link with respect to the map matched link 501. For example, as shown in the FIG. 5, the link 505 may qualify as a right parallel link and the links 507 and 509 may qualify as left parallel links of the map matched link 501.

In some example embodiments, when more than one link qualify as parallel links on same side of the map matched link 501, the system 101 may continue the search for the at least one parallel link until a single parallel link is determined for one side of the map matched link 501. In the fore said case, the search may comprise the fourth criterion. The fourth criterion may comprise that the distance between the geo-graphical location of the road sign 503 and the map matched location of the at least one link is smallest among the distance determined between the geo-graphical location of the road sign 503 and corresponding map matched locations of each link of the plurality of links. Thus, although the links 507 and 509 qualify as the left parallel links, only the link with the smallest distance from the geo-graphical location of the road sign 503 and the map matched location may be extracted as the left parallel link. For example, as shown in the FIG. 5, the link 509 may be extracted as the left parallel link for the map matched link 501. Further, the system 101 may identify the presence data for a blocking link between the map matched link 501 and the at least one parallel link, as will be described in detail with reference to FIGS. 6A and 6B.

FIGS. 6A-6B illustrate scenarios 600*a* and 600*b* for identifying a blocking link between a map matched link and the at least one parallel link, in accordance with an example embodiment. The system 101 may obtain the map data of the region from the map database 103*b*. The system 101 may determine a geographical location of road signs 601*a* and 601*b* (such as the road sign 401 and 503) based on the map data. Herein after the road signs 601*a* and 601*b* may be referred commonly as the road sign 601. The geo-graphical location of the road sign 601 may indicate co-ordinates of a location on which the road sign 601 may be posted. The system 101 may extract a plurality of links associated with the road sign 601 from the map data. The extracted plurality of links may further be searched to determine the map matched link 603*a* and 603*b* (such as the map matched links 403 and 501) of the road sign 601. The system 101 may also determine the at least one parallel link for the map matched link 603*a*. The at least one parallel link may be a right parallel link 605*a* (such as the right parallel link 505) as shown in the FIG. 6A. Alternatively, the at least one parallel link may be a left parallel link 605*b* (such as the left parallel link 509) as shown in the FIG. 6B. The map matched link 603*a* and 603*b* may correspond to a link with highest probability among the plurality of links. Thus, herein after the map matched link 603*a* and 603*b* may be used interchangeably and may be referred to as the map matched link 603. The right parallel link 605*a* and the left parallel link 605*b* may correspond to a link that is parallel to the map matched link 603. Thus, herein after the right parallel link 605*a* and the left parallel link 605*b* may be used interchangeably and may be referred to as the at least one parallel link 605. The map matched link 603 and the at least one parallel link 605 may be determined as described in detail, in the description of FIG. 4 and FIG. 5 respectively.

The system 101 may extract map matched locations of the road sign 601 on each of the plurality of links from the map data. The map matched location of the road sign may indicate a location co-ordinate, such as, latitude and/or longitude of the each of the link of the plurality of links in the region. The system 101 may determine a reference heading or a matched heading for each of the plurality of links using the geo-graphical location of the road sign 601 and the map matched locations of each link in the plurality of links. For example, the system 101 may determine the reference heading for each link of the plurality of links based on the latitude and/or longitude of the geo-graphical location of the road sign 601 and map matched location of the road sign 601 on each link of the plurality of links. The reference heading of a link may indicate direction of the link. For example, for links with same reference heading, the direction of the links may also be same and for links with different reference headings, the direction of the links may be different. The system 101 may obtain a heading of the road sign 601 from the map data. The heading of the road sign 601 may indicate a direction of the sign. Further, the system 101 may determine a difference between the heading of the road sign 601 and the reference heading of each link of the plurality of links. The system 101 may determine at least one link from the plurality of links, such that, the direction of the at least one link is opposite with respect to the direction the road sign 601 based on the determined difference. For example, the at least one link associated with the reference heading, such that the determined difference between the heading of the road sign 601 and the reference heading of the at least one link lie within an upper threshold and a lower threshold, may have the direction opposite with respect to the direction of the road sign 601. The upper threshold and the lower threshold are configurable values. For example, the upper threshold and lower threshold may be 200 degree and 60 degree respectively. It may be contemplated that the values of upper threshold and the lower threshold may be defined considering factors such as link lengths, road type and the like. Further, the at least one link with the direction opposite with respect to the direction of the road sign 601 may have vehicle traffic running in opposite direction with respect to the direction of vehicle traffic in the map matched link 603.

The system 101 may determine a first distance between the geo graphical location of the road sign 601 and map matched location of the at least one link with the direction opposite with respect to the direction of the road sign 601. Further, the system 101 may determine a second distance between the geo graphical location of the road sign 601 and map matched locations of the at least one parallel link 605. The system 101 may determine the at least one link with the direction opposite with respect to the direction of the road sign 601 as at least one blocking link based on the first distance and the second distance. For example, system 101 may determine the at least one link with the direction opposite with respect to the direction of the road sign 601 as at least one blocking link if the first distance is less than the second distance.

The determined at least one blocking link may be between the map matched link 603 and the at least one parallel link 605 as shown in the FIGS. 6A and 6B. For example, the link 607a and 607b that may be located between the map matched link 603 and the at least one parallel link 605 may be identified as the blocking link. A detailed example for determining the blocking link is described in detail with reference to FIG. 7.

FIG. 7 illustrates an example scenario 700 for determining a blocking link based on the heading criterion and the distance criterion, in accordance with an example embodiment.

As shown in FIG. 7 a road sign 701 may be closest to a link 703 and the link 703 may qualify as the map matched link with highest probability than probability of other plurality of links, such as link 705, link 707, link 709 and link 711. Further, the link 705, 707 and the link 709 may be next to the map matched link 703. However, only the link 705 may qualify as the at least one parallel link, as the link 705 may be independent of the map matched link 703 satisfying the first criterion, a difference between the heading of the link 705 and the heading of the map matched link 703 may be less than the heading threshold satisfying the second criterion and a distance between the geo-graphical location of the road sign 701 and the map matched location of the link 705 may less than the distance threshold satisfying the third criterion as described in detail with reference to the FIG. 5. The search for the fourth criterion may not be run in this case as only one link qualifies as the at least one parallel link on one side of the map matched link 703.

Further, the system 101 may be configured to further search for a blocking link. Two links 709 and 711 may be associated with the reference heading, such that the difference between each of the reference heading of the links 709 and 711 and the heading of the road sign 701 may be within the upper threshold and the lower threshold. For example, the difference between each of the reference heading of the links 709 and 711 and the heading of the road sign 701 may be within 200 degree and 60 degree.

However, only the link 709 may qualify as the blocking link as the distance between the geographical location of the road sign 701 and map matched location of link 709 is less than the distance between the geo graphical location of the road sign 701 and map matched locations of the at least one parallel link 705. Thus, the system 101 may identify the link 709 as the blocking link and accordingly generate the presence data of the blocking link. The presence data of the blocking link may indicate whether the blocking link is present or absent between the map matched link 703 and the parallel link 705. Further, based on the presence data of the blocking link, the classification data of the road sign 701 may be generated. In one example embodiment, the classification data may include information for dropping the road sign 701 from the map data of the map matched link 703, if the blocking link is not present. Further, the classification data may indicate whether the road sign 701 is associated with the map-matched link 703 or the parallel link 705 (the parallel link may further be of two types, a left parallel link and a right parallel link.

FIGS. 8A-8D illustrate scenarios for generating classification data of the road signs based on a map matched link and at least one parallel link, in accordance with an example embodiment.

According to various example embodiments, a road sign 805a may be posted near a plurality of links as shown in FIG. 8A. The system 101 may map match the road sign 805a to a link 801a. A link 803a may be parallel to the map matched link 801a. The system 101 may obtain map data from the map database 103b for the region. Further, the system 101 may extract link data of the at least one parallel link 803a from the map data to determine accessibility of the at least one parallel link 803a. The accessibility of the at least one parallel link 803*a* may signify the types of vehicles that may access the link. For example, the at least one parallel link 803*a* may be accessed by only light vehicles, such as, bicycles, motorcycles etc. Further, the at least one parallel link 803*a* may be accessed by only heavy vehicles, such as trucks, buses etc. Alternatively, the at least one parallel link 803*a* may be accessed by only pedestrians. In such case, when the at least one parallel link 803*a* is dedicated only to pedestrians, it may be contemplated that the at least one parallel link 803*a* may not be associated with road signs that may indicate speed limit. As such, the system 101 may associate the road sign 805*a* with the map matched link 801*a* upon determining that the at least one parallel link 803*a* is dedicated to pedestrians.

According to various example embodiments, road signs 805*b* and 807*b* may be posted near a plurality of links as shown in FIG. 8B. The system 101 may map match the road signs 805*b* and 807*b* to a link 801*b*. A link 803*b* may be parallel to the map matched link 801*b*. The system 101 may obtain map data of the region. Further, the system 101 may extract sign data of the roads signs 805*b* and 807*b* from the map data to determine location of the road signs 805*b* and 807*b*. Further, a side of each of the road signs 805*b* and 807*b* with respect to the map matched link may be determined from the sign data. For example, as shown in the FIG. 8B the road sign 805*b* may be posted on left side of the map matched link 801*b* and the road sign 807*b* may be posted on right side of the map matched link 801*b*. In such case, when the road signs 805*b* and 807*b* are map matched to a single link, such as the map matched link 801*b* and when the road signs are posted on either side of the map matched link 801*b*, the system 101 may associated the road signs 805*b* and 807*b* with the map matched link 801*b*.

According to various example embodiments, a road sign 805*c* may be posted near a plurality of links as shown in FIG. 8C. The system 101 may map match the road sign 805*c* to a link 801*c*. A link 803*c* may be parallel to the map matched link 801*c*. Further, the system 101 may determine side of the at least one parallel road 803*c*. For example, as shown in the FIG. 8C, the at least one parallel road 803*c* may be on the right side of the map matched link 801*c*. Further, the system 101 may obtain sign data of the road sign 805*c* to determine the side with respect to the map matched link 801*c*. For example, as shown in the FIG. 8C, the road sign 805*c* may be posted on the left side of the map matched link 801*c*. In such case, when the road signs 805*c* and the at least one parallel road 803*c* are on opposite sides of the map matched link 801*c*, the system 101 may associated the road sign 805*c* with the map matched link 801*c*.

According to various example embodiments, road signs 805*d* and 807*d* may be posted near a plurality of links as shown in FIG. 8D. The system 101 may map match the road signs 805*d* and 807*d* to a link 801*d*. A link 803*d* may be parallel to the map matched link 801*d*. The system 101 may obtain map data of the region. Further, the system 101 may obtain sign data of the road sign 805*d* and the road sign 807*d* to determine the side with respect to the map matched link 801*c*. Alternatively, the system 101 may also determine side of the road sign 805*d* and the road sign 807*d* with respect to the at least one parallel link 803*d*. For example, as shown in the FIG. 8D, the road sign 805*d* may be posted on the right side of the at least one parallel link 803*d*. Further, the system 101 may determine the road sign 807*d* posted on left side of the at least one parallel link 803*d* from the map data. In such case, when the at least one parallel road 803*d* has road signs 805*d* and 807*d* on either side, the system 101 may associate the road signs 805*d* and 807*d* with the at least one parallel link 803*d*.

FIG. 9 illustrates a flowchart for implementation of an exemplary method 900 for generating classification data of a road sign, in accordance with an example embodiment. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described may be embodied by computer program instructions. In this regard, the computer program instructions which embody the described procedures may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

At 901, the method 900 comprises obtaining map data of a sign. The map data may include information about a plurality of links in a region, their heading information, their direction information, and the location co-ordinates of the road sign (such as the road sign 701). The map matched link may be extracted from a plurality of links associated with a sign, such as a road sign in a region. Further, map data of the region may be obtained. The map data may comprise link data comprising information of each link of the plurality of links associated with the road sign. The map data may further comprise sign data comprising information of the road sign. A probability may be determined for each of the plurality of links based on the map data. The determined probability of each link may signify proximity of the link to the road sign. Further, at least one link from the plurality of links may be determined as the map matched link based on the determined probability of the plurality of links. For, example at least one link of the plurality of links associated with the highest probability may be determined as the map matched link.

At 903, the method 900 comprises obtaining the map matched link and at least one parallel link associated with the sign based on the map data. The sign may be the road sign. A search may be run to determine the at least one parallel link from the plurality of links. For example, the search may include filtering criterion comprising one or more of a first criterion, a second criterion, a third criterion and a fourth criterion. The first criterion may comprise that the at least one link of the plurality of links is independent of the map matched link 501, in other words, a link that is part of the map matched link 501 may not be a parallel link. The second criterion may comprise that a difference between the heading of the at least one link and the heading of the map matched link 501 is less than a heading threshold. The third criterion may comprise that a distance between the geo-graphical location of the road sign and the map matched location of the at least one link is less than a distance threshold. The filtering criterion may comprise a fourth criterion when more than one link qualifies as the parallel links on same side of the map matched link. The fourth criterion may comprise that the distance between the geographical location of the road sign and the map matched location of the at least one link is smallest among the distance determined between the geo-graphical location of the road sign and corresponding map matched locations of each link of the plurality of links. The at least one link from the plurality of links that satisfy the filtering criterion may be determined as the at least one parallel link.

At 905, the method 900 comprises determining presence data of at least one blocking link between the map-matched link and the at least one parallel link. The plurality of links associated with the road sign may be obtained. Further, map matched locations of the road sign on each of the plurality of links, geo-graphical location of the road sign and heading of the road sign may be obtained from the map data. A reference heading for each of the plurality of links may be determined using the geo-graphical location of the road sign and the map matched locations of each link in the plurality of links. Further, at least one link with a direction opposite with respect to the direction the road sign is determined based on a difference between the heading of the road sign and the reference heading of each link of the plurality of links. For example, the at least one link associated with the reference heading, such that the determined difference between the heading of the road sign and the reference heading of the at least one link lying within an upper threshold and a lower threshold, may have the direction opposite with respect to the direction of the road sign 601.

Further a first distance between the geo graphical location of the road sign and the map matched location of the at least one link with the direction opposite with respect to the direction of the road sign is determined is conjunction with a second distance between the geo graphical location of the road sign 601 and map matched locations of the at least one parallel link. The at least one link with the direction opposite with respect to the direction of the road sign is determined as the at least one blocking link if the first distance is less than the second distance. Accordingly the presence data of the blocking link may be determined.

At 907, the method 900 comprises generating classification data of the sign (such as the road sign) based on the presence data of the at least one blocking link. The classification data may indicate whether to associate the road sign with the map matched link or drop the road sign from associating with the map matched link. For example, the road sign is classified as a road sign associated with the map matched link if at least one link from the plurality of links is determined as the at least one blocking link. In other words, the road sign is classified as the road sign associated with the map matched link if the at least one blocking link is identified between the map matched link and the at least one parallel link. Alternatively, the road sign is dropped from being associated with the map-matched link if each link in the plurality of links fail to be identified as the at least one blocking link as described in detail at the step 905.

Further, the map database 103b may be updated based on the classification data. For example, the road sign may be associated with the correct link using the classification data. In this way, the mapping platform 103 may be relied to render reliable map data for navigation from a source location to a destination location. The update may be provided as a run time update or a pushed update for a user of the navigation application associated with the mapping platform 103.

In an example embodiment, the system 101 for performing the method 900 described above may comprise a processor (e.g. the processor 201a) configured to perform some or each of the operations (901-907) described above. The processor may, for example, be configured to perform the operations (901-907) by performing hardware implemented logical functions, executing stored instructions, or executing algorithms for performing each of the operations. Alternatively, the system 101 may comprise means for performing each of the operations described above. In this regard, according to an example embodiment, examples of means for performing operations 901-907 may comprise, for example, the processor 201a and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. The focus is on road signs but the methods and applications discussed herein may also apply to other road objects. Further, the methods and applications discussed herein may also apply to train signs, maritime signs, aerial signs and the like within the scope of the invention. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating classification data of a sign, the system comprising:
   at least one non-transitory memory configured to store computer program code instructions; and
   at least one processor configured to execute the computer program code instructions to:
   obtain map data of the sign;

obtain a map matched link and at least one parallel link associated with the sign based on the map data;

determine presence data of at least one blocking link between the map-matched link and the at least one parallel link, wherein the at least one blocking link satisfies one or more of a heading criterion and a distance criterion; and generate the classification data of the sign based on the presence data of the at least one blocking link, wherein to determine the presence data of the at least one blocking link, the at least one processor is further configured to:

determine a location of the sign based on map data;

determine a map matched location of the sign on at least one link of a plurality of links based on the location of the sign; and determine a matched heading for the at least one link based on the map matched location of the sign.

2. The system of claim 1, wherein the presence data indicates that the at least one blocking link is present between the map-matched link and the at least one parallel link, and wherein to generate the classification data of the sign, the sign is associated with the map-matched link based on the presence data.

3. The system of claim 1, wherein the presence data indicates that the at least one blocking link is absent between the map-matched link and the at least one parallel link, and wherein to generate the classification data of the sign, the sign is dropped from being associated with the map-matched link.

4. The system of claim 1, wherein to determine the presence data of the at least one blocking link, the at least one processor is further configured to:

obtain a heading of the sign; and determine a direction of the at least one link based on the heading of the sign and the matched heading for the at least one link.

5. The system of claim 4, wherein to determine the direction of the at least one link, the at least one processor is further configured to:

determine a difference between the heading of the sign and the matched heading for the at least one link; and determine the direction of the at least one link based on the difference satisfying the heading criterion, wherein the heading criterion comprises that the difference is greater than or equal to a first predetermined heading threshold and the difference is lesser than or equal to a second predetermined heading threshold, and wherein the direction of the at least one link is opposite to the sign based on the difference satisfying the heading criterion.

6. The system of claim 5, wherein to determine the at least one blocking link, the at least one processor is further configured to:

obtain a first distance between the location of the sign and the at least one link based on the map data;

obtain a second distance between the location of the sign and the at least one parallel link based on the map data; and determine the at least one link as the at least one blocking link based on the at least one link satisfying the distance criterion, wherein the distance criterion comprises that the first distance is smaller than the second distance.

7. The system of claim 1, wherein to obtain the map matched link the at least one processor is further configured to:

extract a probability of proximity to the sign of each of a second plurality of links from the map data; and determine a link with highest probability of proximity to the sign among probability of proximity of each of the second plurality of links, as the map matched link.

8. The system of claim 7, wherein to obtain the at least one parallel link corresponding to the map matched link, the at least one processor is further configured to:

determine at least one link from the second plurality of links as the at least one parallel link based on the filtering criterion, wherein the filtering criterion comprises at least one of a first criterion, a second criterion, a third criterion and a fourth criterion, wherein the first criterion comprises that the at least one link from the second plurality of links is independent from the map matched link, wherein the second criterion comprises that a difference between a heading of the at least one link and a heading of the map matched link is less than a predefined heading threshold, wherein the third criterion comprises that a distance between a location of the sign and the at least one link is less than a predefined distance threshold, and wherein the fourth criterion comprises that the distance of the at least one link from the location of the sign is minimum in a set of a plurality of distances associated with the second plurality of links, wherein each distance in the set of the plurality of distances is less than the predefined distance threshold.

9. The system of claim 1, wherein to generate the classification data of the sign, the at least one processor is further configured to:

associate the sign with the map matched link based on determining the at least one parallel link as a pedestrian link based on the map data.

10. The system of claim 1, wherein to generate the classification data of the sign, the at least one processor is further configured to:

associate the sign with the map matched link based on determining that the sign lies on an opposite side of the map matched link with respect to the at least one parallel link.

11. A method for generating classification data of a sign, the method comprising:

obtaining map data of the sign;

obtaining a map matched link and at least one parallel link associated with the sign based on the map data;

determining presence data of at least one blocking link between the map-matched link and the at least one parallel link, wherein the at least one blocking link satisfies one or more of a heading criterion and a distance criterion; and generating the classification data of the sign based on the presence data of the at least one blocking link, wherein determining the presence data of the at least one blocking link further comprises:

determining a location of the sign based on map data;

determining a map-matched location of the sign on at least one link of a plurality of links based on the location of the sign; and determining a matched heading for the at least one link based on the map matched location of the sign.

12. The method of claim 11, wherein the presence data indicates that the at least one blocking link is present between the map-matched link and the at least one parallel link, and wherein to generate the classification data of the sign, the sign is associated with the map-matched link based on the presence data.

13. The method of claim 11, wherein the presence data indicates that the at least one blocking link is absent between the map-matched link and the at least one parallel link, and wherein to generate the classification data of the sign, the sign is dropped from being associated with the map-matched link.

14. The method of claim 11, wherein determining the presence data of the at least one blocking link further comprises:
obtaining a heading of the sign; and
determining a direction of the at least one link based on the heading of the sign and the matched heading for the at least one link.

15. The method of claim 14, wherein determining the direction of the at least one link further comprises:
determining a difference between the heading of the sign and the matched heading for the at least one link; and
determining the direction of the at least one link based on the difference satisfying the heading criterion,
wherein the heading criterion comprises that the difference is greater than or equal to a first predetermined heading threshold and the difference is lesser than or equal to a second predetermined heading threshold, and
wherein the direction of the at least one link is opposite to the sign based on the difference satisfying the heading criterion.

16. The method of claim 15, wherein determining the at least one blocking link further comprises:
obtaining a first distance between the location of the sign and the at least one link based on the map data;
obtaining a second distance between the location of the sign and the at least one parallel link based on the map data; and
determining the at least one link as the at least one blocking link based on the at least one link satisfying the distance criterion, wherein the distance criterion comprises that the first distance is smaller than the second distance.

17. The method of claim 11, wherein generating the classification data of the sign further comprises:
associating the sign with the map matched link based on determining that the sign lies on an opposite side of the map matched link with respect to the at least one parallel link.

18. A computer programmable product comprising a non-transitory computer readable medium having stored thereon computer executable instruction which when executed by one or more processors, cause the one or more processors to carry out operations for generating the classification data of a sign, the operations comprising:
obtaining map data of the sign;
obtaining a map matched link and at least one parallel link associated with the sign based on the map data;
determining presence data of at least one blocking link between the map-matched link and the at least one parallel link, wherein the at least one blocking link satisfies one or more of a heading criterion and a distance criterion; and
generating the classification data of the sign based on the presence data of the at least one blocking link,
wherein obtaining the map matched link further comprises:
extracting a probability of proximity to the sign of each of a second plurality of links from the map data; and
determining a link with highest probability of proximity to the sign among probability of proximity of each of the second plurality of links, as the map matched link.

* * * * *